US012770037B2

(12) United States Patent
Shinde et al.

(10) Patent No.: US 12,770,037 B2
(45) Date of Patent: Oct. 20, 2026

(54) SYSTEMS AND METHODS FOR DETERMINING TARGET POPULATIONS FOR STATISTICAL EXPERIMENTS

(71) Applicant: Capital One Services, LLC, McLean, VA (US)

(72) Inventors: Swapnil Shinde, Ashburn, VA (US); William Ibekwe, Dallas, TX (US); Sarah Schmidt, Spring Lake, MI (US); David Welgus, Queens, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 1069 days.

(21) Appl. No.: 17/870,881

(22) Filed: Jul. 22, 2022

(65) Prior Publication Data

US 2024/0028930 A1 Jan. 25, 2024

(51) Int. Cl.
*G06N 5/04* (2023.01)

(52) U.S. Cl.
CPC .................................... *G06N 5/042* (2013.01)

(58) Field of Classification Search
CPC ................................ G06F 17/18; G06N 5/042
See application file for complete search history.

(56) References Cited

U.S. PATENT DOCUMENTS

2021/0090694 A1 * 3/2021 Colley .................. G16B 30/00

FOREIGN PATENT DOCUMENTS

WO WO-2015077708 A1 * 5/2015 ........... G06Q 10/063

OTHER PUBLICATIONS

Lenth "Some Practical Guidelines for Effective Sample-Size Determination", 2001, p. 11, Some-Practical-Guidelines-Effective-Sample-Size-Determination.pdf.*
Kaukanen "Evaluating the impacts of machine learning to the future of A/B testing", 2020, p. 115, Master's Thesis_Kaukanen Miki.*
Pokhilko "Statistical Designs for Network A/B Testing", VCU Thesis and Dissertations, 2019, p. 112.*
Fabijan et al. (Three Key Checklists and Remedies for Trustworthy Analysis of Online Controlled Experiments at Scale, SEIP, 2019 , p. 10.*

* cited by examiner

*Primary Examiner* — Miranda M Huang
(74) *Attorney, Agent, or Firm* — TROUTMAN PEPPER LOCKE LLP; Christopher J. Forstner; John A. Morrissett

(57) ABSTRACT

Systems and methods for automatically determining target populations for statistical experiments are disclosed. The system may receive a hypothesis associated with a statistical experiment and a target population, the hypothesis including one or more target metrics. The system may receive one or more target parameters associated with the target population. The system may determine whether the one or more target parameters match a stored query. In response to the target parameters matching the stored query, the system may query, using the stored query, a user database to determine the target population satisfying the target parameters. The system may predict a sample size for the statistical experiment based on the target population and the target metrics and transmit to the user device a graphical user interface including the predicted sample size.

19 Claims, 8 Drawing Sheets

SYSTEMS AND METHODS FOR DETERMINING TARGET POPULATIONS FOR STATISTICAL EXPERIMENTS

FIELD

The disclosed technology relates to systems and methods for determining target populations for statistical experiments, and more particularly to predicting sample sizes, predicting experiment time periods, automatically selecting a statistical experiment type, and ending statistical experiments when a predetermined degradation metric has been exceeded.

BACKGROUND

Many organizations utilize targeted campaigns to offer services and/or products to their customers. Employees of the organization may lack statistical knowledge and experience in generating queries (e.g., Boolean queries) for determining a target population that meets one or more target parameters. Organizations may wish to run statistical experiments to determine how to most effectively advertise to specific target populations. For example, the organization may wish to determine which campaign slogan is most effective in driving sales in a particular target population, but employees may not have the knowledge to set up and administer a statistical test to answer the question. Users of the system may be required to input complicated Boolean expressions in order to identify the appropriate target population. Additionally, users of the system are required to have statistical knowledge in order to properly define and initiate statistical experiments.

Accordingly, there is a need for improved systems and methods for determining target populations for statistical experiments that streamline the process for users that have little to no experience with Boolean queries and statistical knowledge.

SUMMARY

Disclosed herein are systems and methods for automatically determining target populations for statistical experiments. The system includes one or more processors and memory in communication with the one or more processors and storing instructions, that when executed by the one or more processors, cause the system to perform one or more steps of a method. The system may receive, from a user device, a hypothesis associated with a statistical experiment and a target population, the hypothesis including one or more target metrics. The system may receive, from the user device, one or more target parameters associated with the target population. The system may determine whether the one or more target parameters match a stored query beyond a predetermined threshold. Responsive to the one or more target parameters matching the stored query beyond a predetermined threshold, the system may query, using the stored query, a user database to determine the target population that satisfies the one or more target parameters. The system may predict a sample size for the statistical experiment based on the target population and the one or more target metrics. The system may transmit to the user device, a graphical user interface including the predicted sample size for the statistical experiment.

In another aspect, a system for automatically determining target populations for statistical experiments is disclosed. The system may include one or more processors and a memory in communication with the one or more processors and storing instructions that, when executed by the one or more processors, are configured to cause the system to perform the steps of a method. The system may receive, from a user device, a hypothesis associated with a statistical experiment and a target population, the hypothesis may include one or more target metrics. The system may receive, from the user device, one or more target parameters associated with the target population. The system may determine whether the one or more target parameters match a stored query beyond a predetermined threshold. Responsive to the one or more target parameters matching the stored query, the system may query, using the stored query, a user database to determine the target population that satisfies the one or more target parameters. The system may predict a sample size for the statistical experiment based on the target population and the one or more target metrics. The system may transmit, to the user device, a graphical user interface that includes the predicted sample size for the statistical experiment. The system may receive, from the user device, a selection of a degradation metric, the selected degradation metric associated with the statistical experiment. The system may initialize the statistical experiment and iteratively determine whether the degradation metric has been exceeded while the statistical experiment is active. In response to the degradation metric being exceeded, the system may end the statistical experiment and update the graphical user interface to indicate that the degradation metric has been exceeded.

In another aspect, a system for automatically determining target populations for statistical experiments is disclosed. The system may include one or more processors and a memory in communication with the one or more processors and storing instructions that, when executed by the one or more processors, are configured to cause the system to perform the steps of a method. The system may receive, from a user device, a hypothesis associated with a statistical experiment and a target population. The hypothesis may include one or more target metrics. The system may receive, from the user device, one or more target parameters associated with the target population. The system may determine whether the one or more target parameters match a stored query beyond a predetermined threshold. In response to the one or more target parameters matching the stored query, the system may query, using the stored query, a target population database to determine the target population that satisfies the one or more target parameters. The system may predict a sample size for the statistical experiment based on the target population and the one or more target metrics. The system may transmit, to the user device, a graphical user interface including the predicted sample size for the statistical experiment. The system may determine whether the hypothesis is associated with an optimization experiment or a causal impact experiment. The system may perform a first statistical experiment type selected from an A/B statistical test and a sequential statistical test in response to determining the hypothesis is associated with the causal impact experiment. The system may perform a second statistical experiment type including a multi-arm bandit statistical test in response to determining the hypothesis is associated with the optimization experiment.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

According to certain example implementations of the disclosed technology, systems and methods are disclosed herein for automatically determining target populations for statistical experiments. More particularly, the disclosed technology relates to automatically identifying a query to determine a target population associated with target parameters, predicting sample sizes for a statistical experiment, and monitoring statistical experiments to determine whether a degradation metric has been exceeded. This involves aggregating and normalizing large quantities of data, recognizing connections between the data, and using predictive classification to identify articles of sensitive information within a screen capture. The systems and methods described herein are necessarily rooted in computer and technology as they relate to dynamically translating natural language in computer queries (such as Boolean queries) in order to identify a target population associated with target parameters. In some instances, the system utilizes machine learning models to aggregate the data, reduce and filter the data, and generate queries based on the data. Machine learning models are a unique computer technology that involves training the models to complete tasks, such as labeling, categorizing, or determining computer queries that are associated with identifying a target population that complies with one or more target parameters. Importantly, examples of the present disclosure improves the speed with which computers can identify target populations for statistical experiments, as well as provide for systems and methods which can convert natural language prompts into Boolean queries which can be used to identify target populations.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
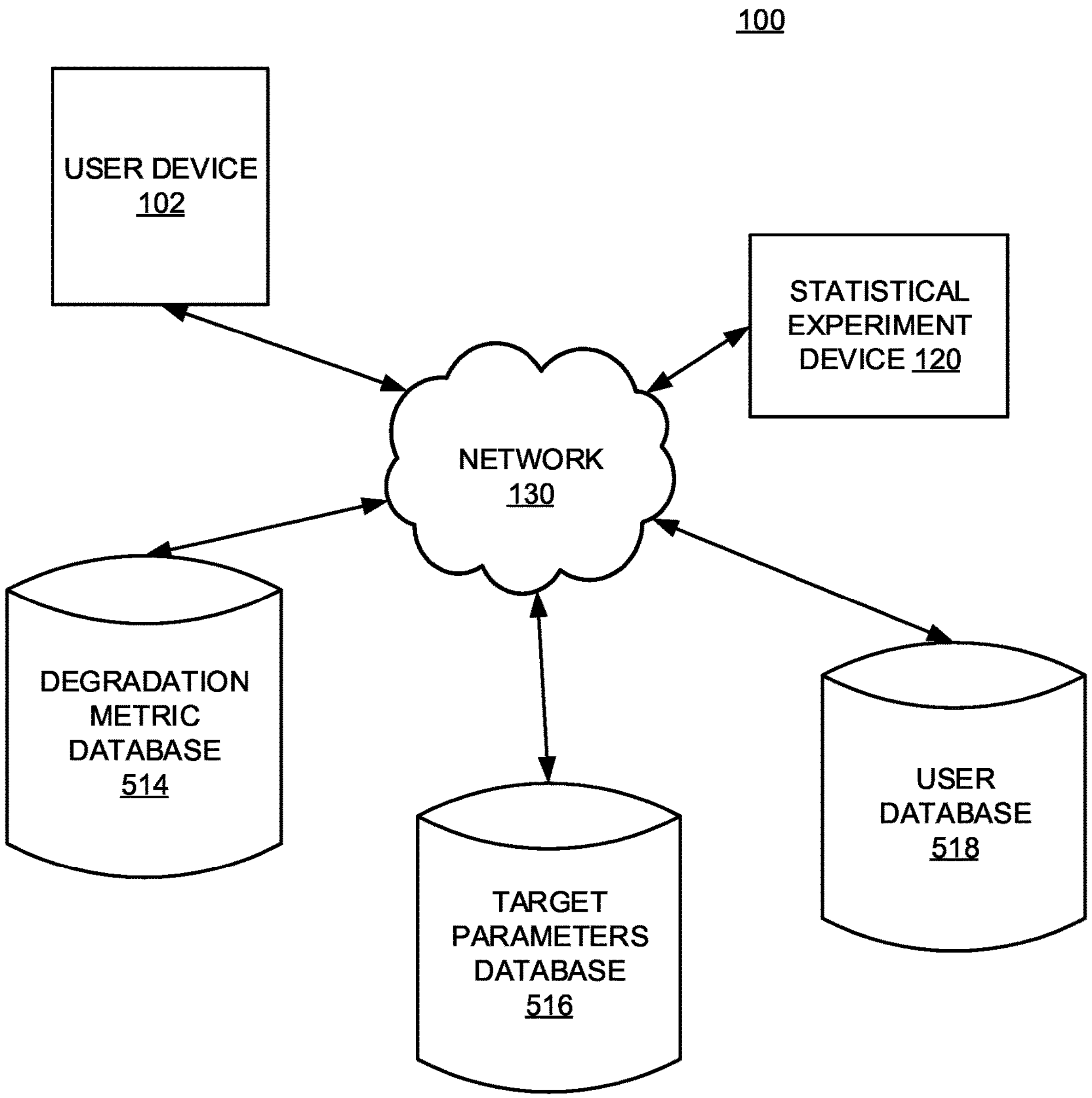
FIG. 1 is a block diagram of example system 100 that may be used to automatically determine target populations for statistical experiments, in accordance with certain embodiments of the disclosed technology.

FIG. 1 is a block diagram of example system 100 that may be used to automatically determine target populations for statistical experiments, in accordance with certain embodiments of the disclosed technology. The components and arrangements shown in FIG. 1 are not meant to limit the disclosed embodiments as the components used to implement the disclosed processes and features may vary. As shown, system 100 may include a user device 102, a statistical experiment device 120, a degradation metric database 114, a target parameters database 116, and a user database 118 all of which may be connected via a network 130.

Statistical experiment device 120 may include a computer system configured to receive input from user device 102 including a hypothesis for a statistical experiment and one or more target parameters associated with a target population. For example, statistical experiment device 120 may be configured to identify a query that may be used to query a database to determine a target population in accordance with the provided target parameters. In some embodiments, the target parameters can include, for example, conditions on a yearly income for each customer stored in a database, a credit score associated with each customer stored in a database, a number of accounts associated with a respective customer with a respective financial service provider, the type of accounts a respective customer has with a financial service provider, financial transactions the customer has performed with one or more financial accounts associated with the financial service provider, etc. Statistical experiment device may additionally be configured to receive natural language prompts and convert the natural language prompts into a standardized Boolean query that can be used to query a database to identify a target population that complies with one or more target parameters. Statistical experiment device also includes the ability to initiate and monitor statistical experiments, and can receive one or more guardrail metrics that are monitored during the course of a given statistical experiment. When a guardrail metric is exceeded, the statistical experiment device 120 can automatically end the statistical experiment.

Figure 2:
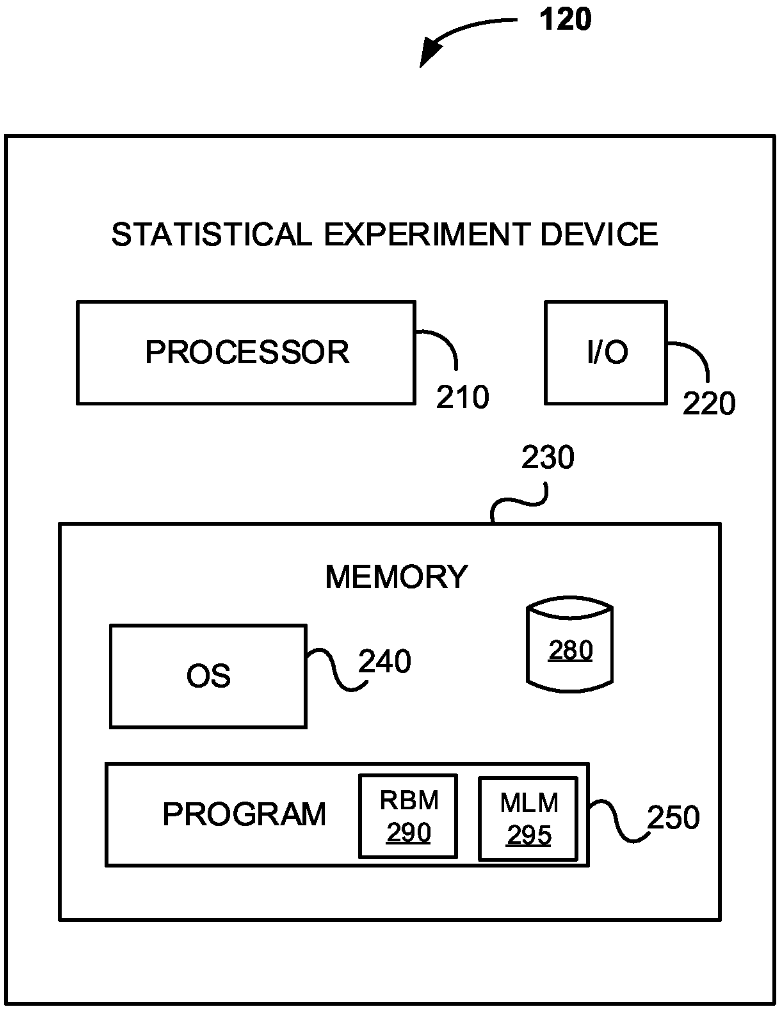
FIG. 2 is a block diagram of an example statistical experiment device 120, in accordance with certain embodiments of the disclosed technology.

An example embodiment of statistical experiment device 120 is shown in more detail in FIG. 2. As shown, statistical experiment device 120 may include a processor 210; an input/output (I/O) device 220; a memory 230, which may contain an operating system 240, a program 250, and a database 280, which may be any suitable repository of data. In some embodiments, statistical experiment device 120 may include a transceiver. In some embodiments, statistical experiment device 120 may include a peripheral interface, a mobile network interface in communication with processor 210, a bus configured to facilitate communication between the various components of statistical experiment device 120, and/or a power source configured to power one or more components of statistical experiment device 120.

In some embodiments, statistical experiment device 120 may include a peripheral interface, which may include the hardware, firmware, and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices when they are within a predetermined range. A transceiver may be compatible with one or more of: radio-frequency identification (RFID), near-field communication (NFC), Bluetooth™, Bluetooth™ low-energy (BLE) (e.g., BLE mesh and/or thread), Wi-Fi™, ZigBee™ ambient backscatter communications (ABC) protocols or similar technologies.

A mobile network interface may provide access to a cellular network, the Internet, or another wide-area network. In some embodiments, a mobile network interface may include hardware, firmware, and/or software that allows processor(s) 210 to communicate with other devices via wired or wireless networks, whether local or wide area, private or public. A power source may be configured to provide an appropriate alternating current (AC) or direct current (DC) to power components.

As described above, statistical experiment device 120 may be configured to remotely communicate with one or more other devices, such as user device 102, degradation metric database 114, target parameters database 116, and/or user database 118. In some embodiments, statistical experiment device 120 may be configured to communication with one or more devices via network 130. According to some embodiments, statistical experiment device 120 may be configured to receive data indicative of one or more target parameters, identify a matching query (e.g., a Boolean query) and/or generate a new matching Boolean query, query a user database 118 to identify a target population, and initiate statistical experiments on the target population.

Processor 210 may include one or more of an application specific integrated circuit (ASIC), programmable logic device, microprocessor, microcontroller, digital signal processor, co-processor or the like or combinations thereof capable of executing stored instructions and operating upon stored data. Memory 230 may include, in some implementations, one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files including operating system 240, application programs 250 (including, for example, a web browser application, a widget or gadget engine, and or other applications, as necessary), executable instructions and data. In some embodiments, processor 210 may include a secure microcontroller, which may be configured to transmit and/or facilitate Boolean expressions. In some embodiments, some or all of the processing techniques described herein can be implemented as a combination of executable instructions and data within memory 230.

Processor 210 may be one or more known processing devices, such as a microprocessor from the Pentium™ family manufactured by Intel™, the Turion™ family manufactured by AMD™, or the Cortex™ family or SecurCore™ manufactured by ARM™. Processor 210 may constitute a single-core or multiple-core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Statistical experiment device 120 may include one or more storage devices 280 configured to store information used by processor 210 (or other components) to perform certain functions related to the disclosed embodiments. As an example, statistical experiment device 120 may include memory 230 that includes instructions to enable processor 210 to execute one or more applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In some embodiments, statistical experiment device 120 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, statistical experiment device 120 may include memory 230 that may include one or more programs 250 to perform one or more functions of the disclosed embodiments. Moreover, processor 210 may execute one or more programs 250 located remotely from, for example and not limitation, user device 102, degradation metric database 114, target parameters database 116, and/or user database 118. For example, statistical experiment device 120 may access one or more remote programs 250, that, when executed, perform functions related to one or more disclosed embodiments. In some embodiments, one or more programs 250 may include a rules-based model 290 configured to parse the one or more target parameters provided to statistical experiment device 120 (e.g., provided by a user of user device 102) and algorithmically generate one or more queries for determining a target population. According to some embodiments, the one or more programs 250 may include a machine learning model 295. The machine learning model 295 may be configured to receive natural language prompts and generate an applicable query that is configured to identify a target population that satisfies one or more target parameters. According to some embodiments, the machine learning model 295 may be implemented as a bidirectional encoder representations from transformers (BERT) model. In some embodiments, the machine learning model 295 may be implemented as a BERT model combined with another machine learning mode, such as IRNet, RAT-SQL, EditSQL, or any other SQL query learning model known in the art.

Memory 230 may include one or more memory devices that store data and instructions used to perform one or more features of the disclosed embodiments. Memory 230 may also include any combination of one or more databases controlled by memory controller devices (e.g., one or more servers, etc.) or software, such as document management systems, Microsoft™ SQL databases, SharePoint™ databases, Oracle™ databases, Sybase™ databases, or other relational databases. Memory 230 may include software components that, when executed by processor 210, perform one or more processes consistent with the disclosed embodiments. In example embodiments of the disclosed technology, statistical experiment device 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While statistical experiment device 120 has been described as one form for implementing the techniques described herein, those having ordinary skill in the art will appreciate that other functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the statistical experiment device 120 may include a greater or lesser number of components than those illustrated.

Network 130 may be of any suitable type, including individual connections via the internet such as cellular or Wi-Fi networks. In some embodiments, network 130 may connect terminals, services, and mobile devices using direct connections such as RFID, NFC, Bluetooth™ BLE, Wi-Fi™, ZigBee™, ABC protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 130 may comprise any type of computer networking arrangement used to exchange data. For example, network 130 may be the Internet, a private data network, virtual private network using a public network, and/or other suitable connection(s) that enables components in system environment 100 to send and receive information between the components of system 100. Network 130 may also include a PSTN and/or a wireless network.

According to some embodiments, a user may operate user device 102. User device 102 can include one or more of a mobile device, smart phone, general purpose computer, tablet computer, laptop computer, telephone, a public switched telephone network (PSTN) landline, smart wearable device, voice command device, other mobile computing device, or any other device capable of communicating with network 130 and/or with one or more components of system 100. User device 102 may belong to or be provided by the user. According to some embodiments, user device 102 may include one or more of: an environmental sensor for obtaining audio or visual data (e.g., a microphone and/or digital camera), a geographic location sensor for determining the location of the device, an input/output device such as a transceiver for sending and receiving data (e.g., via Wi-Fi, cellular communications, near-filed communications, Bluetooth™, and the like), a display for displaying digital images and/or graphical user interfaces generated by components of system 100, one or more processors, and a memory in communication with the one or more processors. According to some embodiments, user device 102 may also include a user interface (U/I) for receiving user input data, such as data representative of a click, a scroll, a tap, a press, a spatial gesture (e.g., as detected by one or more accelerometers and/or gyroscopes), or typing on an input device that can detect tactile inputs. In some embodiments, user device 102 may include a microphone and/or an image capture device, such as a digital camera.

Figure 3:
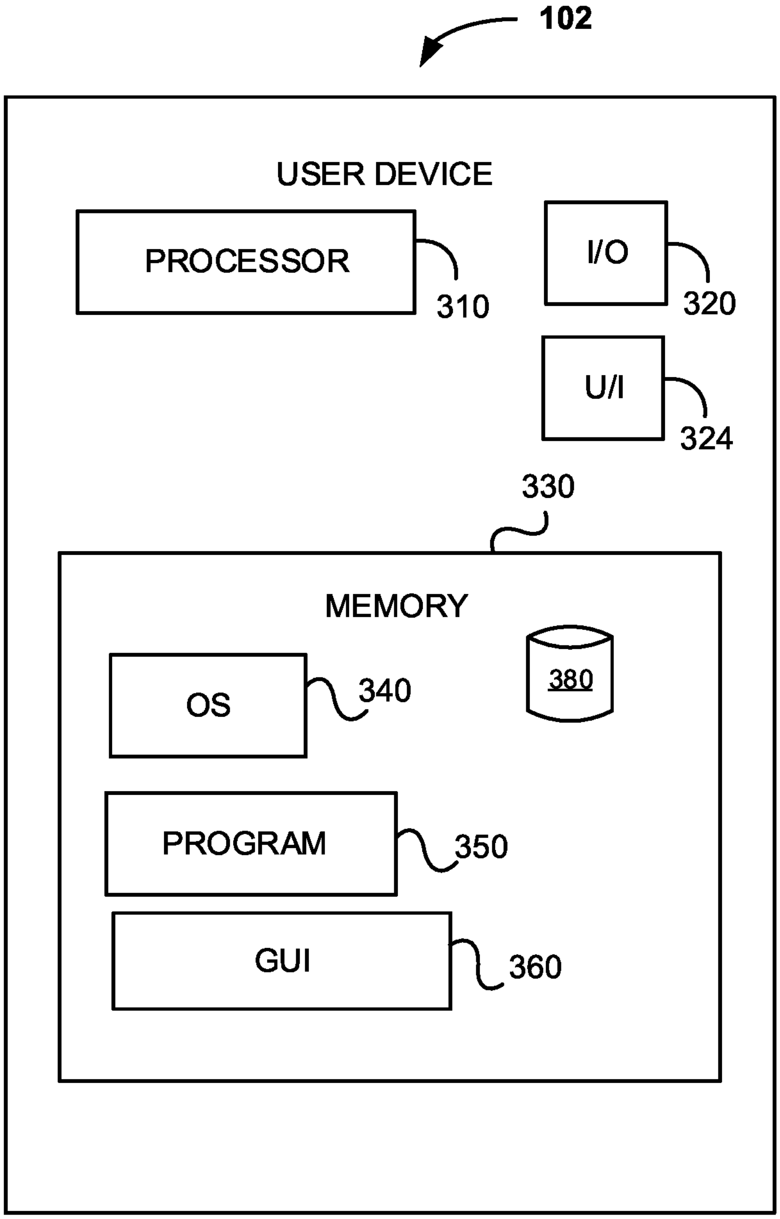
FIG. 3 is a block diagram of an example user device 102, in accordance with certain embodiments of the disclosed technology.

An example embodiment of user device 102 is shown in more detail in FIG. 3. As shown, user device 102 may include a processor 310; an I/O device 320; and a memory 330 containing an OS 340, a program 350, a GUI 360, and a database 380, which may be any suitable repository of data. In some embodiments, user device 102 may include more or fewer components (e.g., the components described herein with respect to statistical experiment device 120), and the various components of user device 102 may include the same or similar attributes or capabilities of the same or similar components discussed with respect to statistical experiment device 120.

In some embodiments, user device 102 may include a transceiver. In some embodiments, user device 102 may include a peripheral interface, a mobile network interface in communication with processor 310, a bus configured to facilitate communication between the various components of user device 102, and/or a power source configured to power one or more components of user device 102.

In some embodiments, user device 102 may include a peripheral interface, which may include the hardware, firmware, and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices when they are within a predetermined range. A transceiver may be compatible with one or more of: radio-frequency identification (RFID), near-field communication (NFC), Bluetooth™, Bluetooth™ low-energy (BLE) (e.g., BLE mesh and/or thread), Wi-Fi™, ZigBee™ ambient backscatter communications (ABC) protocols or similar technologies.

A mobile network interface may provide access to a cellular network, the Internet, or another wide-area network. In some embodiments, a mobile network interface may include hardware, firmware, and/or software that allows processor(s) 310 to communicate with other devices via wired or wireless networks, whether local or wide area, private or public. A power source may be configured to provide an appropriate alternating current (AC) or direct current (DC) to power components.

As described above, user device 102 may be configured to remotely communicate with one or more other devices, such as statistical experiment device 120, degradation metric database 114, target parameters database 116, and/or user database 118. In some embodiments, user device 102 may be configured to communication with one or more devices via network 130. According to some embodiments, user device 102 may be configured to receive data indicative of a target population (e.g., from statistical experiment device 120) and generate a graphical user interface providing data corresponding to a statistical experiment initiated by the statistical experiment device 120.

According to some embodiments, memory 330 may include GUI 360. GUI 360 may be configured to generate a graphical user interface to that can be transmitted to other components of system 100, such as statistical experiment device 120. According to certain embodiments, graphical user interface 360 may allow for a user of user device 102 to graphically select one or more target parameters that may be transmitted back to statistical experiment device 120, allowing statistical experiment device 120 to identify a stored query that is associated with the target parameters.

Returning to FIG. 1, system 100 may include degradation metric database 114. Degradation metric database 114 may have structure and components that are similar to those described with respect to user device 102 and statistical experiment device 120. According to some embodiments, degradation metric database may be configured to store degradation metrics associated with statistical experiments. For example, degradation metrics may include metrics such as webpage load time, app crashes, unsubscribe rates, etc. Degradation metrics may be a secondary metric that is tangential to the statistical experiment but has a direct effect on the quality of service being provided by system 100. Accordingly, system 100 may be configured to end a statistical experiment based on a determination that a selected degradation metric has been exceeded. According to some embodiments, statistical experiment device 120 may be configured to preselect one or more degradation metrics based on a selection of a hypothesis to statistically test by a user of user device 102.

System 100 may also include a target parameters database 116. Target parameters database 116 may have a structure and components that are similar to those described with respect to user device 102, statistical experiment device 120, and/or degradation metric database 114. Target parameters database may be a database configured to store standardized queries associated with a target population that may be used to identify the target population that complies with one or more target parameters. For example, a user of system 100 may wish to run a statistical experiment on a particular subgroup, for example, users of the system 100 that have an annual income over $100,000 a year and a credit score of at least 700. For each target parameter (e.g., annual income, credit score, etc.), the target parameters database 116 may store a standardized query (e.g., a SQL query, a Boolean query, etc.) that allows statistical experiment device 120 to query a user database to using the standardized query to identify the target population that satisfies the target parameters.

System 100 may also include a user database 118. User database 118 may have a structure and components that are similar to those described with respect to user device 102, statistical experiment device 120, degradation metric database 114, and/or target parameters database 116. User database 118 may be configured to store user information, including usernames, annual income, credit score, application usage, transaction/purchase history, and the results of any statistical experiments that have been previously performed for a respective user stored on user database 118. The system (e.g., statistical experiment device 120) may receive target parameters from a user device 102, which may be used to identify one or more queries associated with the target parameter that are stored on target parameters database 116. The queries are used to filter the user information stored on user database 118 in order to identify the relevant target population that satisfies the one or more parameters received from user device 102.

Figure 4:
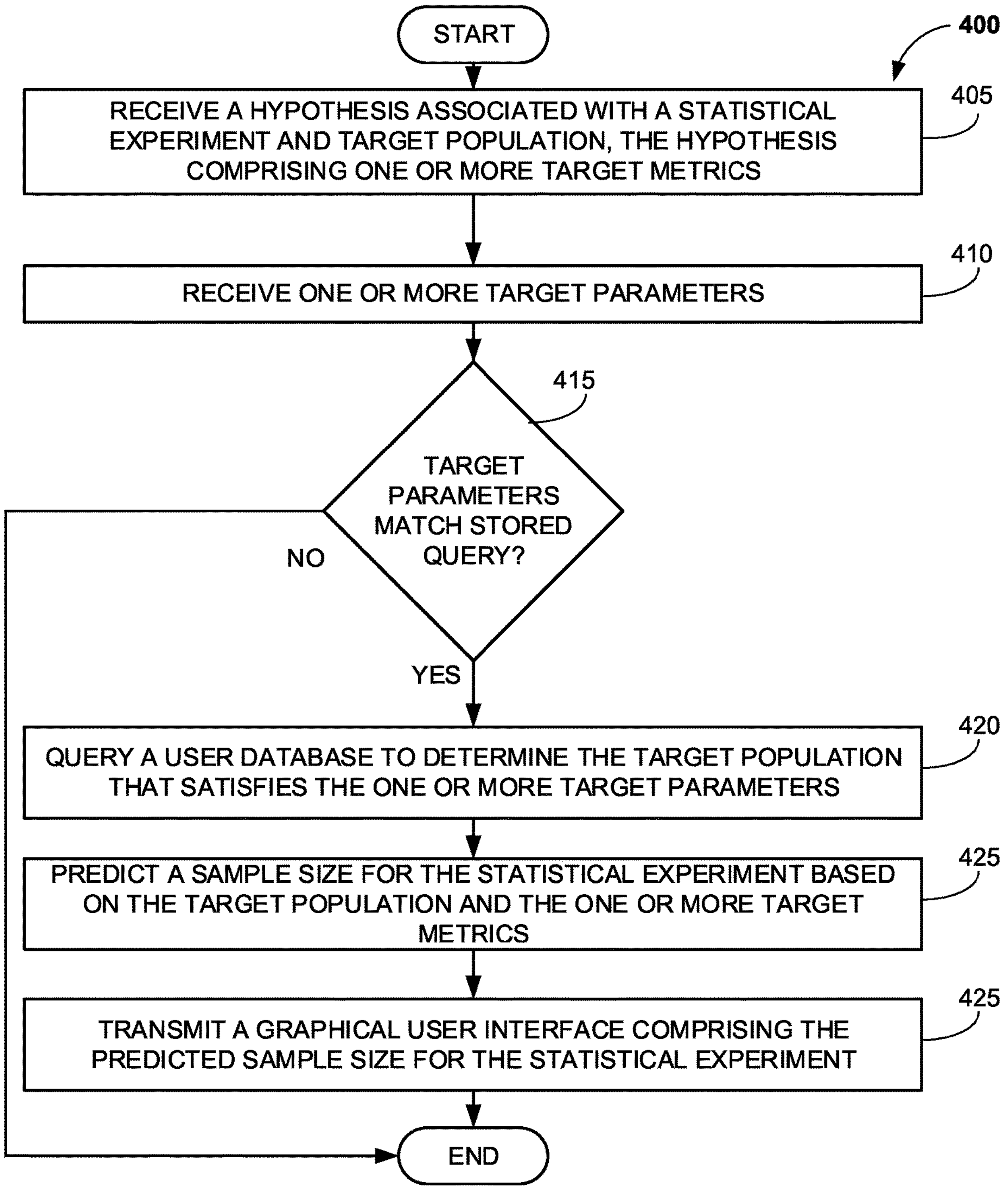
FIG. 4 is a flow diagram 400 illustrating example methods of automatically determining target populations for statistical experiments, in accordance with certain embodiments of the disclosed technology.

FIG. 4 is a flow diagram 400 illustrating example methods of automatically determining target populations for statistical experiments, in accordance with certain embodiments of the disclosed technology. As shown in FIG. 4, in block 405 of method 400, the system may receive a hypothesis associated with a statistical experiment and a target population. The hypothesis may include one or more target metrics. Target metrics can be user-defined and can include website traffic, application traffic, clickstream data, server logs, etc. The hypothesis may include a statement or prediction related to a statistical experiment that a user of system 100 may wish to implement. For example, a user of the system may wish to measure the effect of a different landing web page on a certain target population of users within the system. Accordingly, the user (e.g., operating user device 102) may provide a hypothesis to the system (e.g., statistical experiment device 120) that users visiting the modified landing web page that have a credit score of at least 700 will make a purchase more often than users having the same credit score range visiting the standard landing web page. Accordingly, the selected target metric in the above example may be the product conversion rate associated with a product sold via the landing web page. According to some embodiments, the hypothesis may be received from a user operating user device 102 that is in communication with statistical experiment device 120 over network 130. According to some embodiments, the hypothesis provided to the system by a user may include a statistical power threshold associated with the statistical experiment. The statistical power threshold may indicate the probability of observing a statistically significant result if a true effect of a certain magnitude is present. Variables that may affect statistical power include sample size, minimum detectable effect size, significance level of the statistical conclusion, and the desired power level (e.g., implied false negative error rate). According to some embodiments, the hypothesis provided to the system may include a statistical experiment time period that the user wishes the statistical experiment to run.

In block 410, the system (e.g., statistical experiment device 120) may receive one or more target parameters. The target parameters may be identified by the user (e.g., by using user device 102). For example, a graphical user interface (e.g., GUI 360) may present a list view of pre-stored standardized queries (e.g., stored on target parameters database 116) that are associated with target parameters. If a user of user device 102 wants to filter user database 118 using a new parameter, the user may input the desired parameter using a touch screen, keyboard, or the like to input natural language text associated with the desired parameter. According to some embodiments, the natural language entered into user device 102 may be provided to statistical experiment device 120, which may use machine learning model 295 to convert the natural language into a standardized (e.g., SQL or Boolean) query. The standardized query may be stored in target parameters database 116 so that the query may be utilized by users of system 100 in a successive statistical experiment without having to manually provide the input in a subsequent operation.

In decision block 415, the system (e.g., statistical experiment device 120) may determine whether the one or more target parameters match a stored query beyond a predetermined threshold. For example, based upon the selection of one or more target parameters made by the user of user device 102 in block 410, the system may look for a corresponding standardized query stored on target parameters database 116. When no corresponding standardized query is found stored on target parameters database 116, a new query may be generated as described with respect to block 410. When a corresponding query is determined based on the provided target parameters, the method may move to block 420.

In block 420, the system may query a user database (e.g., user database 118) to determine the target population that satisfies the one or more target parameters. For example, returning to the previous example, the user may wish to determine the effect of a modified landing page on a target population associated with users having a credit score of at least 700. The user of user device 102 graphically selects (e.g., using GUI 360 of user device 102) "credit score greater than 700" as the target parameter. A corresponding standardized query may be identified as stored on target parameters database 116 (e.g., SELECT username, credit_score; FROM user.database; WHERE credit_score>'700'), which may be implemented by statistical experiment device 120 to determine a target population that corresponds to users within system 100 that have a credit greater than 700. In return, statistical experiment device 120 may return information corresponding to the target population, which may be displayed on user device 102 via GUI 360.

In block 425, the system may predict a sample size for the statistical experiment based on the target population and the one or more target metrics. Returning to the previous example, statistical experiment device may identify that there are 500 users within user database 118 that satisfy the target metric "credit score>700." The system (e.g., statistical experiment device 120) may query user database 118 to identify historical user behavior within the target population, such as frequency of visiting the landing page, in order to predict the sample size for the statistical experiment. According to some embodiments, the hypothesis may include a target experiment time, and based on the target population, target experiment time, and historical user behavior, the system may predict the sample size for the statistical experiment. For example, the system may predict that each of the original landing page and the modified landing page would have 600 unique visitors within the target experiment time. In block 430, the system (e.g., statistical experiment device 120) may transmit instructions to generate a graphical user interface (e.g., GUI 360) on user device 102 that includes the predicted sample size for the statistical experiment.

According to some embodiments, the statistical experiment device 120 may be further configured to identify a subpopulation of the target population for which the statistical experiment indicates a greater effect size than a remainder of the target population. For example, if the target population includes the target parameters "annual income>$100,000" and "credit score>700," and the target metric is "click through rate" for two versions of the same webpage, the system may determine that the target population subgroup associated with "annual income>$100,000" is associated with a greater effect size than for the target population associated with "credit score>700." Accordingly, statistical experiment device 120 may graphically identify that subpopulation of users making more than $100,000 are more likely to click on the modified web page than the remainder of the target population (e.g., those users with a credit score>700 with annual income less than or equal to $100,000).

In some embodiments, machine learning model 295 may be further configured to automatically identify a Simpson's paradox within the statistical experiment. A Simpson's paradox occurs when a group of data shows a particular trend, but this trend either disappears or reverses when the groups of data are combined together. For example, given a dependent variable Y (i.e., an outcome being measured) and $X=\{X1, X2, \ldots, X_m\}$ being the set of in independent variables (e.g., metrics), machine learning model 295 may be configured to identify pairs of metrics ($X_p$, $X_c$) such that a trend in Y as a function of $X_p$ disappears or reverses when the data is disaggregated by conditioning on $X_c$. For example, the system may automatically detect a Simpson's paradox pair of metrics when, for example, users within system 100 having a credit score>700 are found to have a statistically significant preference for purchasing a good or service when presented with a modified webpage but the trend reverses when considering users having a credit score>700 but an annual income<$100,000. Accordingly, statistical experiment generator may determine that the metric pairs (credit score, annual income) are a Simpson's pair and that annual income may be a confounding metric for the statistical experiment.

Figure 5:
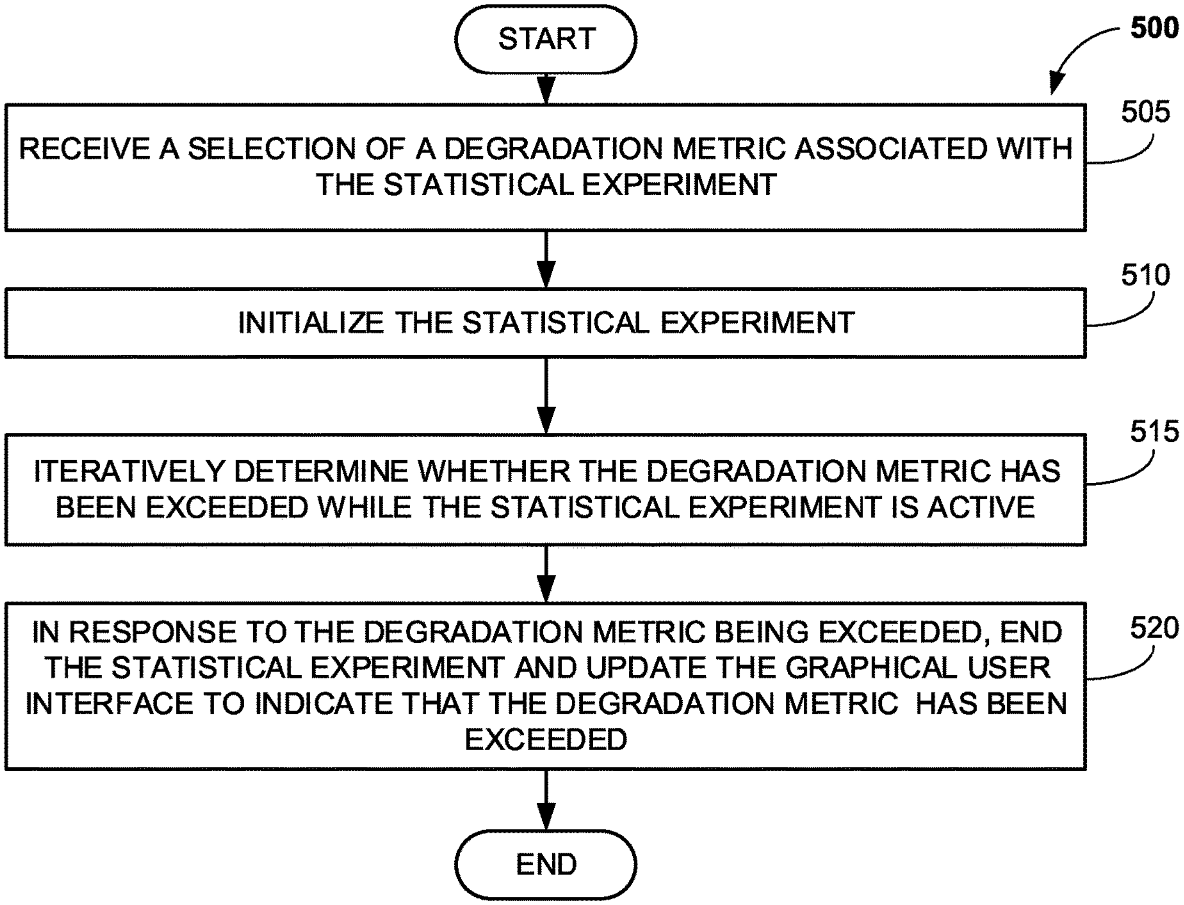
FIG. 5 is a flow diagram 500 illustrating example methods of determining whether a degradation metric has been exceeded, in accordance with certain embodiments of the disclosed technology.

FIG. 5 is a flow diagram 500 illustrating example methods of determining whether a degradation metric has been exceeded, in accordance with certain embodiments of the disclosed technology. In block 505, the system (e.g., statistical experiment device 120) may receive a selection of a degradation metric (e.g., from user device 102) associated with the statistical experiment. A plurality of previously-defined degradation metrics may be stored by the system on degradation metric database 114. Degradation metrics can be understood as metrics that are secondary to the target metrics (e.g., what is being measured by the statistical experiment), but may be used by the system to monitor the statistical experiment while it is being run to determine whether user experience has been sacrificed while optimizing a target metric. For example, degradation metrics may include metrics such as webpage load time, app crashes, unsubscribe rates, etc. In block 510, the system (e.g., statistical experiment device 120) may initialize the statistical experiment. In block 515, the system may iteratively determine whether the degradation metric has been exceeded while the statistical experiment is active. For example, if the selected degradation metric is for webpage load time, the system will monitor the statistical experiment and iteratively determine whether the page load time of each webpage being tested against the target population has exceeded the user-specified degradation metric.

In block 520, in response to determining that the degradation metric has been exceeded, the system may end the statistical experiment. In addition, the system may update the graphical user interface (e.g., GUI 360) presented on the user device 102 to indicate that the statistical experiment has been ended prematurely because the degradation metric specified by the user has been exceeded.

Figure 6:
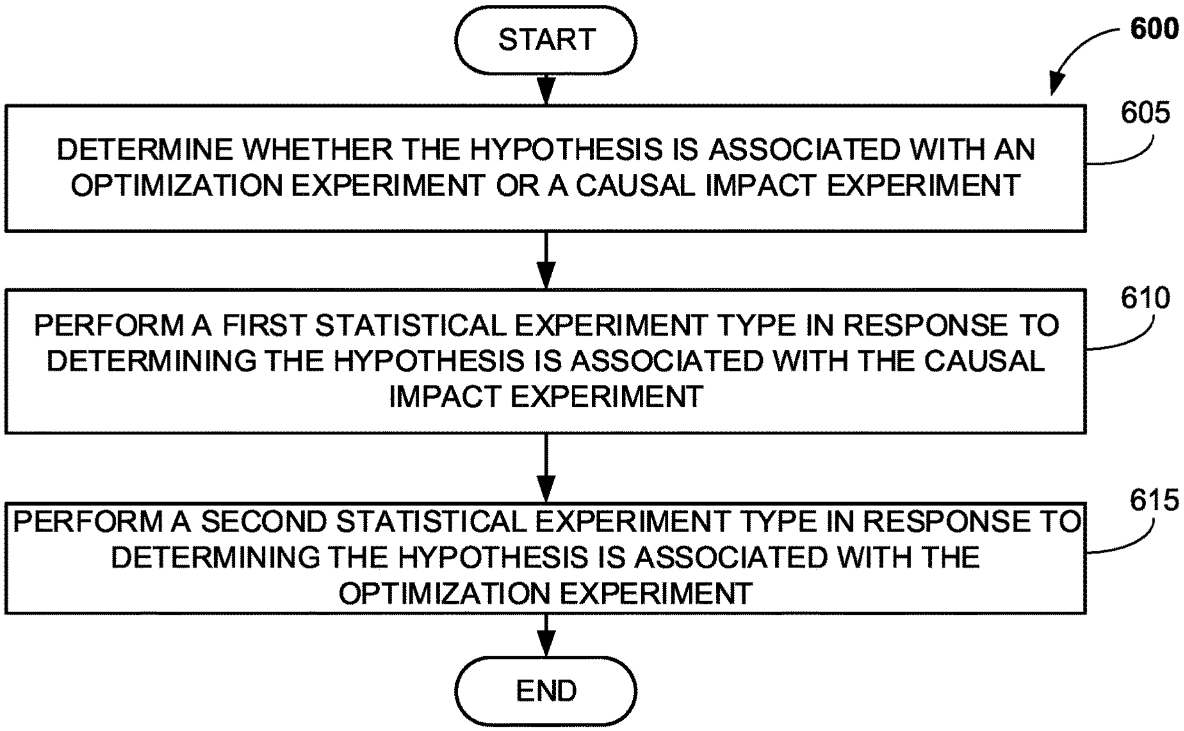
FIG. 6 is a flow diagram 600 illustrating example methods of selecting a statistical experiment type, in accordance with certain embodiments of the disclosed technology.

FIG. 6 is a flow diagram 600 illustrating example methods of selecting a statistical experiment type, in accordance with certain embodiments of the disclosed technology. In block 605, the system may determine whether the hypothesis is associated with an optimization experiment or a causal impact experiment. For example a causal impact experiment may be used to determine whether a particular target parameter has a statistically significant effect on a target metric. An optimization experiment may be used to determine whether a particular target parameter is correlated with a statistically significant effect on a target metric. The system may determine that the hypothesis is associated with an optimization experiment when it asks about correlation and not causation, and may determine that the hypothesis is associated with a causal impact experiment when the hypothesis asks about causation instead of correlation.

In block 610, the system may perform a first statistical experiment type in response to determining the hypothesis is associated with a causal impact experiment. For example, the first statistical experiment type may be a A/B statistical test or a sequential statistical test. According to some embodiments, the system (e.g., statistical experiment device 120) may use machine learning model 295 to parse the hypothesis and predict that the hypothesis is associated with a causal impact experiment.

In block 615, the system may perform a second statistical experiment type in response to determining the hypothesis is associated with an optimization experiment. For example, the second statistical experiment type may be a multi-arm bandit statistical test. According to some embodiments, the system (e.g., statistical experiment device 120) may use machine learning model 295 to parse the hypothesis and predict that the hypothesis is associated with an optimization experiment.

Figure 7:
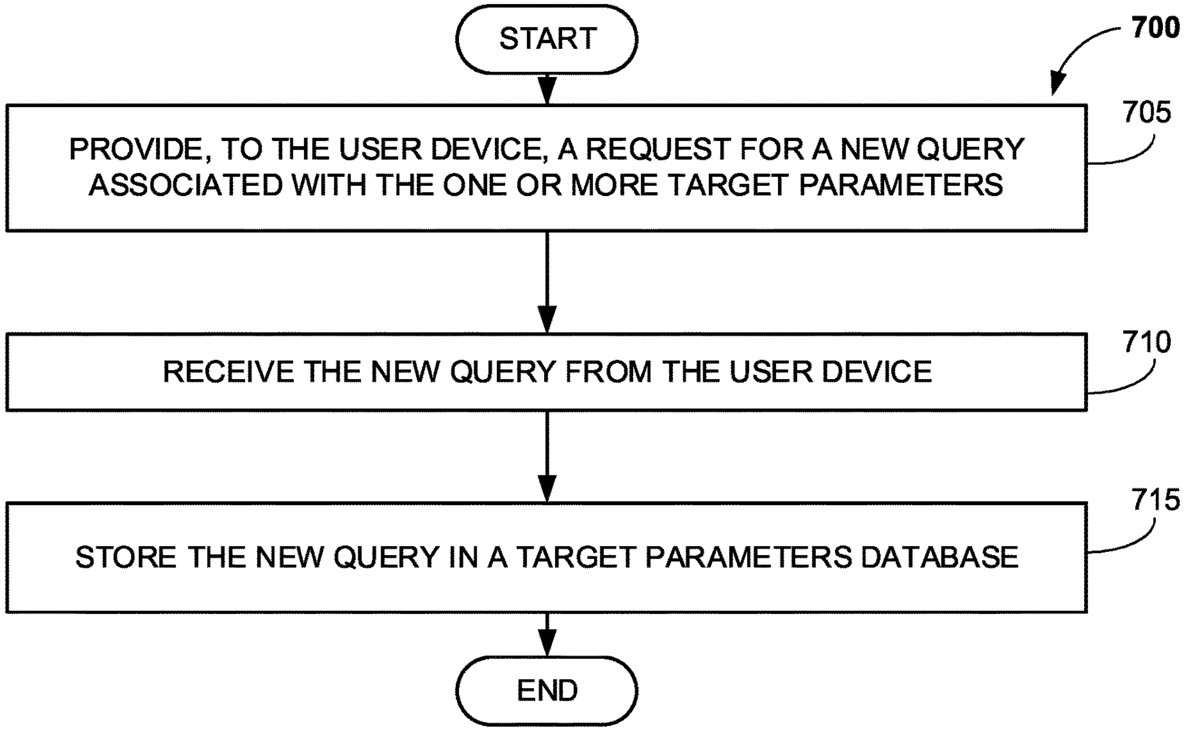
FIG. 7 is a flow diagram 700 illustrating example methods of storing a new query associated with one or more target parameters, in accordance with certain embodiments of the disclosed technology.

FIG. 7 is a flow diagram 700 illustrating example methods of storing a new query associated with one or more target parameters, in accordance with certain embodiments of the disclosed technology. In block 705, the system (e.g., statistical experiment device 120) may provide, to the user device (e.g., user device 102), a request for a new query associated with the one or more target parameters.

In block 710, the system (e.g., statistical experiment device 120) may receive the new query from the user device. According to some embodiments, user device 102 may provide the query fully formed as a standardized (e.g., Boolean and/or SQL) query, and the query may be stored as-is in block 715. In some embodiments, the query may be provided as a natural language prompt, and the statistical experiment device 120 may utilize machine learning model 295 to convert the natural language prompt into a standardized query. In block 715, the system may store the new query in a target parameters database (e.g., target parameters database 116).

Figure 8:
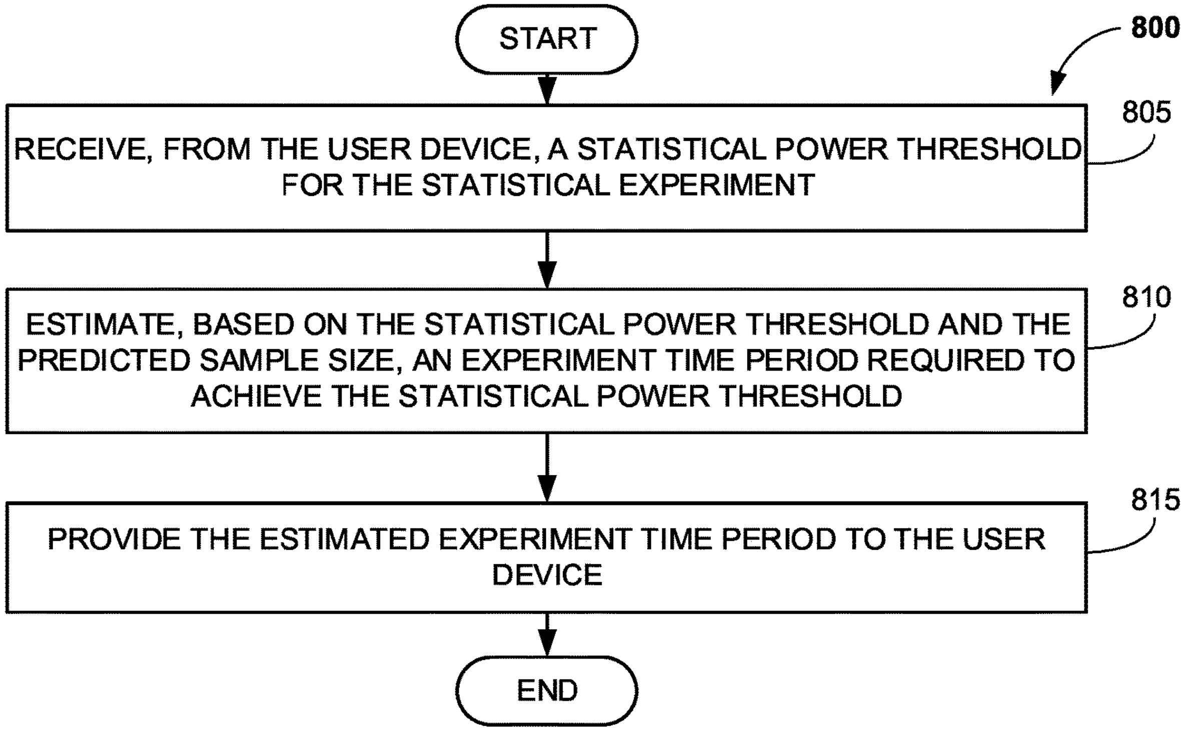
FIG. 8 is a flow diagram 800 illustrating example methods of estimating an experiment time period, in accordance with certain embodiments of the disclosed technology.

FIG. 8 is a flow diagram 800 illustrating example methods of estimating an experiment time period, in accordance with certain embodiments of the disclosed technology. In block 805, the system (e.g., statistical experiment device 120) may receive, from the user device, a statistical power threshold for the statistical experiment. For example, the user may provide a user-specified statistical power threshold of 80%. The user-specified statistical power threshold may be interpreted as the probability that the statistical test correctly rejects a null hypothesis when a specific alternative hypothesis is true.

In block 810, the system (e.g., statistical experiment device 120) may estimate, based on the statistical power threshold and the predicted sample size, an experiment time period required to achieve the statistical power threshold. In block 815, the system may provide the estimated experiment time period to the user device.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

An operator of the system may wish to initialize a statistical experiment to determine how a redesigned landing webpage affects product sales for a target population. The user may define the target population by providing one or more target parameters associated with the target population. For example, the operator may wish to target users that make at least $100,000 in annual income and are men and women in the age group of 30 to 49. Accordingly, the operator may graphically select the one or more target parameters by interacting with GUI 360 of user device 102. For example, the operator may select "age range" and set it to be 30 to 49. The operator may additionally select "annual income" and select "greater than $100,000." In addition, the operator may graphically select one or more target metrics from a drop-down menu in GUI 360. For example, the operator may select "conversion rate" as the target metric for the statistical experiment, and may provide the hypothesis that the modified web page will increase conversion rate as the hypothesis. Finally, the operator may also select a degradation metric for the statistical experiment. The operator may select from a pull-down menu of GUI 360 that the web page load time must remain less than 5 seconds. The system may analyze the target parameters, target metrics, and hypothesis and may determine an estimated sample size based on the provided inputs. The operator may initialize the statistical experiment, and the system may monitor the degradation metric during experimentation. The system iteratively determines whether the degradation metric has been exceeded, and when it is exceeded, the system may stop the statistical experiment and provide the results to the user via GUI 360 of user device 102.

Examples of the present disclosure can be implemented according to at least the following clauses:

Clause 1: A system for automatically determining target populations for statistical experiments, the system comprising: one or more processors; a memory in communication with the one or more processors and storing instructions that, when executed by the one or more processors, are configured to cause the system to: receive, from a user device, a hypothesis associated with a statistical experiment and a target population, the hypothesis comprising one or more target metrics; receive, from the user device, one or more target parameters associated with the target population; determine whether the one or more target parameters match a stored query beyond a predetermined threshold; responsive to the one or more target parameters matching the stored query, query, using the stored query, a user database to determine the target population that satisfies the one or more target parameters; predict a sample size for the statistical experiment based on the target population and the one or more target metrics; and transmit, to the user device, a graphical user interface comprising the predicted sample size for the statistical experiment.

Clause 2: The system of clause 1, wherein the instructions, when executed by the one or more processors are configured to cause the system to: provide, to the user device, a selection of a statistical experiment type selected from an A/B statistical test, a multi-arm bandit statistical test, and a sequential statistical test.

Clause 3: The system of clause 2, wherein providing the selection of the statistical experiment type further comprises: determining whether the hypothesis is associated with an optimization experiment or a causal impact experiment; preselecting either the A/B statistical test or the sequential statistical test responsive to determining the hypothesis is associated with the causal impact experiment; and preselecting the multi-arm bandit statistical test responsive to determining the hypothesis is associated with the optimization experiment.

Clause 4: The system of clause 1, wherein the stored query further comprises a Boolean query.

Clause 5: The system of clause 1, wherein the target metrics comprise one or more of website traffic, application traffic, clickstream data, server logs, or combinations thereof.

Clause 6: The system of claim 1, wherein the instructions, when executed by the one or more processors are configured to cause the system to: responsive to the one or more target parameters not matching the stored query, provide, to the user device, a request for a new query associated with the one or more target parameters; receive the new query from the user device; and store the new query in a target parameters database.

Clause 7: The system of claim 1, wherein the instructions, when executed by the one or more processors are configured to cause the system to: receive, from the user device, a selection of a degradation metric stored on a degradation metric database, the selected degradation metric associated with the statistical experiment; initialize the statistical experiment; iteratively determine whether the degradation metric has been exceeded while the statistical experiment is active; and in response to the degradation metric being exceeded, end the statistical experiment and update the graphical user interface to indicate that the degradation metric has been exceeded.

Clause 8: The system of clause 1, wherein the instructions, when executed by the one or more processors are configured to cause the system to: receive, from the user device, a statistical power threshold for the statistical experiment; estimate, based on the statistical power threshold and the predicted sample size, an experiment time period required to achieve the statistical power threshold; and provide the estimated experiment time period to the user device.

Clause 9: The system of clause 1, wherein the instructions, when executed by the one or more processors are configured to cause the system to: identify a subpopulation of the target population associated with a first target parameter of the one or more target parameters for which the statistical experiment indicates a greater effect size than a remainder of the target population.

Clause 10: A system for automatically determining target populations for statistical experiments, the system comprising: one or more processors; a memory in communication with the one or more processors and storing instructions that, when executed by the one or more processors, are configured to cause the system to: receive, from a user device, a hypothesis associated with a statistical experiment and a target population, the hypothesis comprising one or more target metrics; receive, from the user device, one or more target parameters associated with the target population; determine whether the one or more target parameters match a stored query beyond a predetermined threshold; responsive to the one or more target parameters matching the stored query, query, using the stored query, a user database to determine the target population that satisfies the one or more target parameters; predict a sample size for the statistical experiment based on the target population and the one or more target metrics; transmit, to the user device, a graphical user interface comprising the predicted sample size for the statistical experiment; receive, from the user device, a selection of a degradation metric stored on a degradation metric database, the selected degradation metric associated with the statistical experiment; initialize the statistical experiment; iteratively determine whether the degradation metric has been exceeded while the statistical experiment is active; and in response to the degradation metric being exceeded, end the statistical experiment and update the graphical user interface to indicate that the degradation metric has been exceeded.

Clause 11: The system of claim 10, wherein the instructions, when executed by the one or more processors are configured to cause the system to: receive, from the user device, a statistical power threshold for the statistical experiment; estimate, based on the statistical power threshold and the predicted sample size, an experiment time period required to achieve the statistical power threshold; and provide the estimated experiment time period to the user device.

Clause 12: The system of clause 10, wherein the instructions, when executed by the one or more processors are configured to cause the system to: identify a subpopulation of the target population associated with a first target parameter of the one or more target parameters for which the statistical experiment indicates a greater effect size than a remainder of the target population.

Clause 13: The system of clause 10, wherein the instructions, when executed by the one or more processors are configured to cause the system to: responsive to the one or more target parameters not matching the stored query, provide, to the user device, a request for a new query associated with the one or more target parameters; receive the new query from the user device; and store the new query in a target parameters database.

Clause 14: The system of clause 10, wherein initializing the statistical experiment further comprises providing, to the user device, a selection of a statistical experiment type selected from an A/B statistical test, a multi-arm bandit statistical test, and a sequential statistical test.

Clause 15: The system of clause 14, wherein initializing the statistical test further comprises: determining whether the hypothesis is associated with an optimization experiment or a causal impact experiment; initializing either the A/B statistical test or the sequential statistical test responsive to determining the hypothesis is associated with the causal impact experiment; and initializing the multi-arm bandit statistical test responsive to determining the hypothesis is associated with the optimization experiment.

Clause 16: A system for automatically determining target populations for statistical experiments, the system comprising: one or more processors; a memory in communication with the one or more processors and storing instructions that, when executed by the one or more processors, are configured to cause the system to: receive, from a user device, a hypothesis associated with a statistical experiment and a target population, the hypothesis comprising one or more target metrics; receive, from the user device, one or more target parameters associated with the target population; determine whether the one or more target parameters match a stored query beyond a predetermined threshold; responsive to the one or more target parameters matching the stored query, query, using the stored query, a target population database to determine the target population that satisfies the one or more target parameters; predict a sample size for the statistical experiment based on the target population and the one or more target metrics; transmit, to the user device, a graphical user interface comprising the predicted sample size for the statistical experiment; determine whether the hypothesis is associated with an optimization experiment or a causal impact experiment; perform a first statistical experiment type selected from an A/B statistical test and a sequential statistical test in response to determining the hypothesis is associated with the causal impact experiment; and perform a second statistical experiment type comprising a multi-arm bandit statistical test in response to determining the hypothesis is associated with the optimization experiment.

Clause 17: The system of clause 16, wherein the instructions, when executed by the one or more processors are configured to cause the system to: responsive to the one or more target parameters not matching the stored query, provide, to the user device, a request for a new query associated with the one or more target parameters; receive the new query from the user device; and store the new query in a target parameters database.

Clause 18: The system of clause 16, wherein the instructions, when executed by the one or more processors are configured to cause the system to: receive, from the user device, a selection of a degradation metric stored on a degradation metric database, the selected degradation metric associated with the statistical experiment; determine whether the degradation metric has been exceeded while the statistical experiment is active; and in response to the degradation metric being exceeded, end the statistical experiment and update the graphical user interface to indicate that the degradation metric has been exceeded.

Clause 19: The system of clause 16, wherein the instructions, when executed by the one or more processors are configured to cause the system to: receive, from the user device, a statistical power threshold for the statistical experiment; estimate, based on the statistical power threshold and the predicted sample size, an experiment time period required to achieve the statistical power threshold; and provide the estimated experiment time period to the user device.

Clause 20: The system of clause 16, wherein the instructions, when executed by the one or more processors are configured to cause the system to identify a subpopulation of the target population associated with a first target parameter of the one or more target parameters for which the statistical experiment indicates a greater effect size than a remainder of the target population.

The invention claimed is:

1. A system for automatically determining target populations for statistical experiments, the system comprising:

one or more processors;

a memory in communication with the one or more processors and storing instructions that, when executed by the one or more processors, are configured to cause the system to:

receive, from a user device, a natural-language hypothesis associated with a statistical experiment and a target population, the hypothesis comprising one or more target metrics;

convert, using machine learning models comprising a bidirectional encoder representations from transformers (BERT) model and a SQL query learning model, the natural-language hypothesis into a standardized query by:

identifying one or more target parameters associated with the target population, determining whether the hypothesis is associated with a causal impact experiment or an optimization experiment, and determining whether a Simpson's paradox exists within the statistical experiment by identifying disappearing trends or reversing trends when combining the one or more target metrics;

determine whether the one or more target parameters match a stored query beyond a predetermined threshold;

responsive to the one or more target parameters matching the stored query, query, using the stored query, a user database to determine the target population that satisfies the one or more target parameters, the stored query comprising a Boolean query;

predict a sample size for the statistical experiment based on the target population and the one or more target metrics;

generate a graphical user interface comprising the predicted sample size and an indication whether a Simpson's paradox exists within the statistical experiment;

transmit, to the user device, the graphical user interface; and train the one or more machine learning models to convert future natural-language hypotheses into standardized queries.

2. The system of claim 1, wherein the instructions, when executed by the one or more processors are configured to cause the system to:

provide, to the user device, a selection of a statistical experiment type selected from an A/B statistical test, a multi-arm bandit statistical test, and a sequential statistical test.

3. The system of claim 2, wherein providing the selection of the statistical experiment type further comprises:

preselecting either the A/B statistical test or the sequential statistical test responsive to determining the hypothesis is associated with the causal impact experiment; and preselecting the multi-arm bandit statistical test responsive to determining the hypothesis is associated with the optimization experiment.

4. The system of claim 1, wherein the target metrics comprise one or more of website traffic, application traffic, clickstream data, server logs, or combinations thereof.

5. The system of claim 1, wherein the instructions, when executed by the one or more processors are configured to cause the system to:

responsive to the one or more target parameters not matching the stored query, provide, to the user device, a request for a new query associated with the one or more target parameters;

receive the new query from the user device; and store the new query in a target parameters database.

6. The system of claim 1, wherein the instructions, when executed by the one or more processors are configured to cause the system to:

receive, from the user device, a selection of a degradation metric stored on a degradation metric database, the selected degradation metric associated with the statistical experiment;

initialize the statistical experiment;

iteratively determine whether the degradation metric has been exceeded while the statistical experiment is active; and in response to the degradation metric being exceeded, end the statistical experiment and update the graphical user interface to indicate that the degradation metric has been exceeded.

7. The system of claim 1, wherein the instructions, when executed by the one or more processors are configured to cause the system to:

receive, from the user device, a statistical power threshold for the statistical experiment;

estimate, based on the statistical power threshold and the predicted sample size, an experiment time period required to achieve the statistical power threshold; and provide the estimated experiment time period to the user device.

8. The system of claim 1, wherein the instructions, when executed by the one or more processors are configured to cause the system to:

identify a subpopulation of the target population associated with a first target parameter of the one or more target parameters for which the statistical experiment indicates a greater effect size than a remainder of the target population.

9. A system for automatically determining target populations for statistical experiments, the system comprising:

one or more processors;

a memory in communication with the one or more processors and storing instructions that, when executed by the one or more processors, are configured to cause the system to:

receive, from a user device, a natural-language hypothesis associated with a statistical experiment and a target population, the hypothesis comprising one or more target metrics;

convert, using machine learning models comprising a bidirectional encoder representations from transformers (BERT) model and a SQL query learning model, the natural-language hypothesis into a standardized query by:

identifying one or more target parameters associated with the target population, and determining whether the hypothesis is associated with a causal impact experiment or an optimization experiment;

determine whether the one or more target parameters match a stored query beyond a predetermined threshold;

responsive to the one or more target parameters matching the stored query, query, using the stored query, a user database to determine the target population that satisfies the one or more target parameters, the stored query comprising a Boolean query;

predict a sample size for the statistical experiment based on the target population and the one or more target metrics;

transmit, to the user device, a graphical user interface comprising the predicted sample size for the statistical experiment;

receive, from the user device, a selection of a degradation metric stored on a degradation metric database, the selected degradation metric associated with the statistical experiment;

initialize the statistical experiment;

determine, using the machine learning models, whether a Simpson's paradox exists within the statistical experiment by identifying disappearing trends or reversing trends when combining the one or more target metrics;

iteratively determine whether the degradation metric has been exceeded while the statistical experiment is active;

in response to the degradation metric being exceeded or that a Simpson's paradox exists, end the statistical experiment and update the graphical user interface to indicate that the degradation metric has been exceeded or that a Simpson's paradox exists; and train the one or more machine learning models to convert future natural-language hypotheses into standardized queries.

10. The system of claim 9, wherein the instructions, when executed by the one or more processors are configured to cause the system to:

receive, from the user device, a statistical power threshold for the statistical experiment;

estimate, based on the statistical power threshold and the predicted sample size, an experiment time period required to achieve the statistical power threshold; and provide the estimated experiment time period to the user device.

11. The system of claim 9, wherein the instructions, when executed by the one or more processors are configured to cause the system to:

identify a subpopulation of the target population associated with a first target parameter of the one or more target parameters for which the statistical experiment indicates a greater effect size than a remainder of the target population.

12. The system of claim 9, wherein the instructions, when executed by the one or more processors are configured to cause the system to:

responsive to the one or more target parameters not matching the stored query, provide, to the user device, a request for a new query associated with the one or more target parameters;

receive the new query from the user device; and store the new query in a target parameters database.

13. The system of claim 9, wherein initializing the statistical experiment further comprises providing, to the user device, a selection of a statistical experiment type selected from an A/B statistical test, a multi-arm bandit statistical test, and a sequential statistical test.

14. The system of claim 13, wherein initializing the statistical test further comprises:

initializing either the A/B statistical test or the sequential statistical test responsive to determining the hypothesis is associated with the causal impact experiment; and initializing the multi-arm bandit statistical test responsive to determining the hypothesis is associated with the optimization experiment.

15. A system for automatically determining target populations for statistical experiments, the system comprising:

one or more processors;

a memory in communication with the one or more processors and storing instructions that, when executed by the one or more processors, are configured to cause the system to:

receive, from a user device, a natural-language hypothesis associated with a statistical experiment and a target population, the hypothesis comprising one or more target metrics;

convert, using machine learning models comprising a bidirectional encoder representations from transformers (BERT) model and a SQL query learning model, the natural-language hypothesis into a standardized query by:

identifying one or more target parameters associated with the target population, determining whether the hypothesis is associated with a causal impact experiment or an optimization experiment, and determining whether a Simpson's paradox exists within the statistical experiment by identifying disappearing trends or reversing trends when combining the one or more target metrics;

determine whether the one or more target parameters match a stored query beyond a predetermined threshold;

responsive to the one or more target parameters matching the stored query, query, using the stored query, a target population database to determine the target population that satisfies the one or more target parameters, the stored query comprising a Boolean query;

predict a sample size for the statistical experiment based on the target population and the one or more target metrics;

transmit, to the user device, a graphical user interface comprising the predicted sample size for the statistical experiment and an indication whether a Simpson's paradox exists within the statistical experiment;

perform a first statistical experiment type selected from an A/B statistical test and a sequential statistical test in response to determining the hypothesis is associated with the causal impact experiment; and perform a second statistical experiment type comprising a multi-arm bandit statistical test in response to determining the hypothesis is associated with the optimization experiment; and train the one or more machine learning models to convert future natural-language hypotheses into standardized queries.

16. The system of claim 15, wherein the instructions, when executed by the one or more processors are configured to cause the system to:

responsive to the one or more target parameters not matching the stored query, provide, to the user device, a request for a new query associated with the one or more target parameters;

receive the new query from the user device; and store the new query in a target parameters database.

17. The system of claim 15, wherein the instructions, when executed by the one or more processors are configured to cause the system to:

receive, from the user device, a selection of a degradation metric stored on a degradation metric database, the selected degradation metric associated with the statistical experiment;

determine whether the degradation metric has been exceeded while the statistical experiment is active; and in response to the degradation metric being exceeded, end the statistical experiment and update the graphical user interface to indicate that the degradation metric has been exceeded.

18. The system of claim 15, wherein the instructions, when executed by the one or more processors are configured to cause the system to:

receive, from the user device, a statistical power threshold for the statistical experiment;

estimate, based on the statistical power threshold and the predicted sample size, an experiment time period required to achieve the statistical power threshold; and provide the estimated experiment time period to the user device.

19. The system of claim 15, wherein the instructions, when executed by the one or more processors are configured to cause the system to identify a subpopulation of the target population associated with a first target parameter of the one or more target parameters for which the statistical experiment indicates a greater effect size than a remainder of the target population.

* * * * *